US009254737B2

(12) United States Patent
Kaltenbach et al.

(10) Patent No.: US 9,254,737 B2
(45) Date of Patent: Feb. 9, 2016

(54) HYBRID DRIVE FOR A VEHICLE

(71) Applicant: ZF Friedrichshafen AG, Friedrichshafen (DE)

(72) Inventors: Johannes Kaltenbach, Friedrichshafen (DE); Uwe Griesmeier, Markdorf (DE); Daniel Ortner, Friedrichshafen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 14/520,814

(22) Filed: Oct. 22, 2014

(65) Prior Publication Data

US 2015/0107408 A1 Apr. 23, 2015

(30) Foreign Application Priority Data

Oct. 23, 2013 (DE) ......................... 10 2013 221 461

(51) Int. Cl.
*F16H 37/06* (2006.01)
*B60K 6/365* (2007.10)
*B60K 6/36* (2007.10)
(Continued)

(52) U.S. Cl.
CPC . *B60K 6/365* (2013.01); *B60K 6/36* (2013.01); *B60K 6/48* (2013.01); *B60K 6/547* (2013.01); *B60K 2006/4808* (2013.01); *B60K 2006/4825* (2013.01); *B60K 2006/4841* (2013.01); *Y10S 903/91* (2013.01); *Y10T 74/19014* (2015.01)

(58) Field of Classification Search
CPC .. B60K 6/48; B60K 2006/4825; F16H 3/089; F16H 59/02
USPC .................................... 74/661, 665 A, 665 B
See application file for complete search history.

(56) References Cited

U.S. PATENT DOCUMENTS 6,490,945 B2 * 12/2002 Bowen ..................... B60K 6/52 74/339
6,634,986 B2 * 10/2003 Kima ..................... B60K 6/365 475/5
7,611,433 B2 * 11/2009 Forsyth .................... B60K 6/40 180/65.6

(Continued)

FOREIGN PATENT DOCUMENTS

DE 199 34 696 A1 5/2001
DE 10 2006 027 709 A1 12/2007

(Continued)

OTHER PUBLICATIONS

German Office Action for DE 10 2013 221 461.8, dated Jul. 4, 2014 (German Language), including English translation of p. 7.

*Primary Examiner* — Ha D Ho
(74) *Attorney, Agent, or Firm* — Brinks Gilson & Lione

(57) ABSTRACT

A hybrid drive of a motor vehicle includes a combustion engine, an electric machine, a gear box, and a superimposed transmission. The gearbox includes an input shaft, and first and second output shafts, and the input shaft is connected to the first and second output shafts via switchable spur gear stages. The superimposed transmission is connected non-rotatably to a hollow shaft arranged coaxially with the second output shaft. The hollow shaft is connected non-rotatably to an idler of an axially adjacent switchable spur gear stage via a first coupling-switching element, and the hollow shaft is fixed at a housing via an interlock switching device. A bridging contact member connects the hollow shaft to the superimposed transmission, and the superimposed transmission is also permanently connected to a rotor of the electric machine.

20 Claims, 8 Drawing Sheets

(51) Int. Cl.

*B60K 6/48* (2007.10)

*B60K 6/547* (2007.10)

(56) References Cited

U.S. PATENT DOCUMENTS 8,517,876 B2 * 8/2013 Sakai .................... B60K 6/387
475/5

8,622,862 B2 * 1/2014 Koyama .................. B60K 6/36
180/65.21

FOREIGN PATENT DOCUMENTS

DE 10 2010 030 567 A1 12/2011
DE 10 2010 043 354 A1 5/2012
DE 10 2011 086 327 A1 5/2013

* cited by examiner

| Operation mode | VM | S1 | S2 | S3 | S4 | EM | i | phi |
|---|---|---|---|---|---|---|---|---|
| EDA operation | G2 | -- | K | -- | -- | -- | | |
| E driving | -- | -- | -- | -- | L | E1 | 7,69 | 1,63 |
| E driving | -- | -- | -- | -- | M | E2 | 4,73 | |
| V driving | G1 | A | -- | -- | -- | -- | 11,70 | 1,50 |
| V driving | G2 | -- | B | -- | -- | -- | 7,80 | 1,45 |
| V driving | G3 | -- | -- | G | L | -- | 5,36 | 1,31 |
| V driving | G4 | D | -- | -- | -- | -- | 4,10 | 1,24 |
| V driving | G5 | -- | -- | G | M | -- | 3,30 | 1,24 |
| V driving | G6 | -- | -- | F | -- | -- | 2,65 | |
| V+E driving | G1 | A | -- | -- | L | E1 | | |
| V+E driving | G2 | -- | B | -- | L | E1 | | |
| V+E driving | G3 | -- | -- | G | L | E1 | | |
| V+E driving | G4 | D | -- | -- | M | E2 | | |
| V+E driving | G5 | -- | -- | G | M | E2 | | |
| V+E driving | G6 | -- | -- | F | M | E2 | | |

| Operation mode | VM | S1 | S2 | S3 | S4 | EM | i | phi |
|---|---|---|---|---|---|---|---|---|
| EDA operation | G2 | -- | K | -- | -- | -- | | |
| E driving | -- | -- | -- | -- | L | E1 | 19,99 | 1,63 |
| E driving | -- | -- | -- | -- | M | E2 | 12,30 | |
| V driving | G1 | A | -- | -- | -- | -- | 11,70 | 1,50 |
| V driving | G2 | -- | B | -- | -- | -- | 7,80 | 1,45 |
| V driving | G3 | -- | -- | G | L | -- | 5,36 | 1,31 |
| V driving | G4 | D | -- | -- | -- | -- | 4,10 | 1,24 |
| V driving | G5 | -- | -- | G | M | -- | 3,30 | 1,24 |
| V driving | G6 | -- | -- | F | -- | -- | 2,65 | |
| V+E driving | G1 | A | -- | -- | L | E1 | | |
| V+E driving | G2 | -- | B | -- | L | E1 | | |
| V+E driving | G3 | -- | -- | G | L | E1 | | |
| V+E driving | G4 | D | -- | -- | M | E2 | | |
| V+E driving | G5 | -- | -- | G | M | E2 | | |
| V+E driving | G6 | -- | -- | F | M | E2 | | |

HYBRID DRIVE FOR A VEHICLE

PRIORITY STATEMENT

This application claims the benefit of German Patent Application DE 10 2013 221 461.8, filed Oct. 23, 2013, and incorporates the German Patent Application by reference herein in its entirety.

FIELD

The present disclosure relates to a hybrid drive of a motor vehicle, which includes a combustion engine with a drive shaft, an electric machine and an automated gearbox.

BACKGROUND

The statements in this section merely provide background information related to the present disclosure and may not constitute prior art.

It is generally known that in a hybrid drive a superimposed transmission constructed in planetary design can be used for superimposing the torques and speeds of a combustion engine or an electric machine. Compared with other construction types of superimposed transmissions, a planetary transmission has the advantage that the transmission components have compact measurements and adjusted bearing forces.

DE 199 34 696 A1 describes a combination of a combustion engine, an electric machine and a superimposed transmission depicted as an electrodynamic drive system (EDA), which precedes a gearbox in countershaft design and allows for an abrasion-free start. According to FIG. 1 of the above-mentioned patent specification, a first embodiment of this hybrid drive shows that the superimposed transmission is designed in the form of a simple planetary transmission with a sun wheel, a planet carrier supporting multiple planetary gears and a ring gear. The ring gear of the planetary transmission is connected non-rotatably to the drive shaft of the combustion engine and forms the first input element of the superimposed transmission. The sun wheel of the planetary transmission is connected non-rotatably to the rotor of the electric machine and forms the second input element of the superimposed transmission. The planet carrier of the planetary transmission is connected non-rotatably to the input shaft of the gearbox and forms the output element of the superimposed transmission.

In this hybrid drive, the abrasion-free start occurs in that the combustion engine maintains a mostly constant speed and the electric machine is first controlled in generator operation with increasing drag torque until the rotor reaches a standstill and then accelerated in engine operation with opposite direction of rotation until the transmission components of the planetary transmission achieve synchronized movement. When a synchronized movement in the planetary transmission is achieved, a lock-up clutch situated between the sun wheel and the planet carrier is closed so that during further combustion operation the planetary transmission revolves in the block. In this operating condition, the electric machine can be run as a motor for a boost operation, operated as a generator for charging an electric energy storage device or switched powerless. When the drive shaft of the combustion engine is connected to the ring gear of the planetary transmission via a decoupler which can be engaged and disengaged, the combustion engine can also be disconnected and shut off to allow for pure electric drive. Without changing anything, the gearbox of this hybrid drive can also be used for a conventional drive, in which a start with the combustion engine takes place wear-prone via the slip operation of a decoupler designed in the form of a friction clutch.

DE 10 2010 030 567 A1 and DE 10 2010 043 354 A1 describe hybrid drives in which a respective gearbox in countershaft design, which is combined for drive-connecting an electric machine to a superimposed transmission constructed in planetary design, is specifically configured for use in a hybrid drive. Therefore, the respective gearbox cannot be modified with only a few changes to be used in a conventional drive train nor can it be derived therefrom. Therefore, its development and production are comparatively expensive.

In a first version of the hybrid drive described in DE 10 2010 030 567 A1, according to FIG. 1, the two input shafts are arranged coaxially and axially adjacent to one another and can be connected with one another non-rotatably via a coupling-switching element. The first input shaft is connected via a decoupler designed in the form of a friction clutch to the drive shaft of the combustion engine and can be connected via a switchable spur gear stage to the output shaft. The superimposed transmission designed in the form of a simple planetary transmission is arranged coaxially and axially adjacent to the second input shaft. Therefore, the ring gear of the planetary transmission forms the first input element of the superimposed transmission. The sun wheel of the planetary transmission is connected non-rotatably to the rotor of the electric machine and therefore forms the second input element of the superimposed transmission. Via a bridging contact member, the planet carrier of the planetary transmission can be connected non-rotatably to the second input shaft of the gearbox and via a further switchable spur gear stage, it can be connected to the output shaft. As a result, the planet carrier of the planetary transmission forms the output element of the superimposed transmission.

Besides the possibility for an abrasion-free start, this well-known hybrid drive has three gears for combustion operation and two gears for electric drive. In addition, there is the possibility of independently charging an electric energy storage device by means of the combustion engine, as well as the ability of starting the motor of the combustion engine by means of the electric machine. However, this hybrid drive has the disadvantage of having only a small number of gear steps available in the combustion operation and low transmission efficiency in the electric drive resulting from the drag losses of the spur gear stages.

In the hybrid drive according to DE 10 2010 043 354 A1, the superimposed transmission designed in the form of a simple planetary transmission is arranged within the gearbox in countershaft design, which has two input shafts and one output shaft. The first input shaft of the gearbox is arranged axially parallel to the output shaft, connected to the drive shaft of the combustion engine via a decoupler designed in the form of a friction clutch, and can be connected to the output shaft of the gearbox via two spur gear stages respectively consisting of idlers. The second input shaft of the gearbox is arranged axially parallel to the first input shaft and output shaft, connected non-rotatably to the rotor of the electric machine, and can be connected to the output shaft of the gearbox via two spur gear stages also respectively consisting only of idlers. The spur gear stages of the first input shaft and the second input shaft are arranged in identical, or almost identical, gear levels and utilize in the one case a mutual idler which is arranged on the output shaft. In the other case, the idlers of the two spur gear stages arranged on the output shaft are connected with one another in a rotationally fixed manner. The superimposed transmission designed in the form of a simple planetary transmission is arranged coaxially with the output shaft between the two gear levels. The ring gear of the planetary transmission is connected non-rotatably to the two idlers of the first gear level, which are also connected with one another in a rotationally fixed manner. Via a respective switching device, said idlers can be connected to the first input shaft or the second input shaft, and via a further switching device they can be connected non-rotatably directly to the output shaft. As a result, the ring gear of the planetary transmission can form the first input element or the second input element of the superimposed transmission. By means of a switching device, the sun wheel of the planter transmission can be connected non-rotatably to the mutual idler of the second gear level, which idler, in turn, can be connected via a respective switching device to the first input shaft or the second input shaft, and via a further switching device, it can be connected non-rotatably directly to the output shaft. Therefore, the sun wheel of the planetary transmission can also form the first input element or the second input element of the superimposed transmission. The planet carrier is connected non-rotatably to the output shaft and, accordingly, forms the output element of the superimposed transmission.

Besides the possibility for an abrasion-free start, this well-known hybrid drive has seven gears for combustion operation, including four winding gears, and seven gears for electric drive, also including four winding gears. This hybrid drive also involves the possibility of independently charging an electric energy storage device by means of the combustion engine and the possibility of starting the motor of the combustion engine by means of the electric machine. However, this hybrid drive has the disadvantage of having a large number of required switching devices, a large number of switching devices to be engaged and disengaged for most of the gears, and poor transmission efficiency in the winding gears.

On the other hand, in the non-prepublished patent DE 10 2013 215 114 A, the same applicant proposes several embodiments of a hybrid drive of the design mentioned above, which have a gearbox in countershaft design and a superimposed transmission in planetary design. Said hybrid drive has a large number of gears for combustion operation and two gears with high transmission efficiency for electric drive, and it has a gearbox which can be derived with a few modifications from a conventional gearbox.

In this well-known hybrid drive, the superimposed transmission is arranged coaxially with a free end of an output shaft of the gearbox. A first input element of the superimposed transmission is connected non-rotatably to a hollow shaft which is arranged coaxially with the output shaft. Via a coupling-switching element, said hollow shaft can be connected non-rotatably to an idler of an axially directly adjacent spur gear stage of the gearbox in order to couple the combustion engine. For bridging the superimposed transmission, it is possible via a bridging contact member to connect non-rotatably the hollow shaft to a further transmission component of the superimposed transmission. For shifting a second gear step for the electric drive, the hollow shaft is fixed at the housing via a switching device. A second input element of the superimposed transmission is permanently drive connected to a rotor of the electric machine, and the output element of the superimposed transmission is connected non-rotatably to the output shaft of the gearbox.

SUMMARY

The present disclosure provides a motor vehicle with a hybrid drive, which includes a combustion engine with a drive shaft, an electric machine with a rotor that can be operated as a motor and a generator, an automated gearbox in countershaft design with an input shaft and at least an output shaft, as well as a superimposed transmission constructed in planetary design with two input elements and an output element. The input shaft is connected via a controllable decoupler or directly to the drive shaft, and can be connected to the output shaft via multiple selectively switchable spur gear stages, and the superimposed transmission is arranged coaxially with a free end of the output shaft. The first input element is connected non-rotatably to a hollow shaft arranged coaxially with the output shaft, and via a coupling-switching element the hollow shaft can be connected non-rotatably to the idler of a directly adjacent axial spur gear stage, via an interlock switching device it can be fixed at the housing, and via a bridging contact member it can be connected non-rotatably to the second input element or to the output element, wherein the second input element of the superimposed transmission is permanently drive connected to the rotor of the electric machine, and in which the output element of the superimposed transmission is connected non-rotatably to the output shaft.

According to the present disclosure, the input shaft of the gearbox can be drive connected to the second input element of the superimposed transmission via a coupler spur gear stage, which comprises a drive gear and an output gear, and which can be connected by means of a second coupling-switching element.

The present disclosure also provides a method for starting the combustion engine by means of the electric machine during an electromotive driving operation.

Therefore, the present disclosure is based on the hybrid drive of a motor vehicle which has been disclosed in DE 10 2013 215 114 A1, and the present disclosure includes a combustion engine with a drive shaft, an electric machine with a rotor that can be operated as a motor and a generator, an automated gearbox in countershaft design with an input shaft and at least an output shaft, as well as a superimposed transmission constructed in planetary design with two input elements and an output element, wherein the input shaft is connected via a controllable decoupler or directly to the drive shaft and can be connected via multiple selectively switchable spur gear stages to the output shaft. The superimposed transmission is arranged coaxially with a free end of the output shaft, and the first input element is connected to a hollow shaft arranged coaxially with the output shaft, and via a coupling-switching element the hollow shaft can be connected non-rotatably to the idler of a directly adjacent axial spur gear stage, via a switching device it can be fixed at the housing, and via a bridging contact member it can be connected non-rotatably to the second input element or to the output element. The second input element of the superimposed transmission is permanently drive connected to the rotor of the electric machine, and in which the output element of the superimposed transmission is connected non-rotatably to the output shaft.

To achieve functional improvements and more compact measurements of this hybrid drive, it has been arranged that the input shaft of the gearbox can be drive connected to the second input element of the superimposed transmission via a switchable coupler spur gear stage.

As a result, it is possible to produce an output-free drive connection between the combustion engine and the electric machine by engaging a single shift element, namely the attached second coupling-switching element. In one form, during a standstill of the vehicle or during a driving operation when the gearbox is shifted to neutral, i.e., in driveless propulsion phases, it is possible to use this drive connection for charging an electric energy storage device by means of the electric machine, which is then used as generator, or for starting the combustion engine by means of the electric machine, which is then used as a motor. In addition, by using the interlock switching device and the bridging contact member of the superimposed transmission, it is possible to connect via this drive connection two additional gears for combustion operation, thus saving two spur gear stages of the gearbox and the associated installation space.

To be able to arrange the above-mentioned coupler spur gear stage in a space-saving manner axially between the gearbox and the superimposed transmission, a first further development of the present disclosure provides that the output gear of the coupler spur gear stage is arranged on the second hollow shaft, which is arranged coaxially with the first hollow shaft and connected non-rotatably to the second input element of the superimposed transmission, as well as to a coupling half of the bridging contact member.

In a first embodiment of the coupler spur gear stage, it has been arranged that the drive gear of the coupler spur gear stage is designed in the form of an idler, which is swivel-mounted on the input shaft of the gearbox and which can be connected non-rotatably to said input shaft via the second coupling-switching element. It has also been arranged that the output gear of the coupler spur gear stage is designed in the form of a fixed gear, which is connected non-rotatably on the second hollow shaft.

The design of the coupler spur gear stage has the advantage that the second coupling-switching element is combined in a dual shift element with the gear shifting member of a directly axially adjacent spur gear stage of the gearbox, provided that its idler is swivel-mounted on the input shaft, which simplifies the shift device and saves installation space. However, the design has the disadvantage that in electric drive the coupler spur gear stage is driven load-free via the second input element of the superimposed transmission or the second hollow shaft or, in another from, the directly axially adjacent spur gear stage of the gearbox is driven load-free via the associated output shaft, and the transmission efficiency is reduced because of the resulting drag losses.

To avoid this disadvantage, it has been arranged in a second embodiment of the coupler spur gear stage that the drive gear of the coupler spur gear stage is designed in the form of a fixed gear, which is swivel-mounted on the second hollow shaft and which can be connected non-rotatably to the hollow shaft via the second coupling-switching element.

Based on knowing the present disclosure, it is self-evident that for achieving high transmission efficiency in electric drive it is necessary that also the fixed gears of the remaining spur gear stages of the gearbox would have to be arranged non-rotatably on the input shaft and their idlers on the respectively associated output shaft, so that in electric drive these spur gear stages are not driven via the respective output shaft.

To be able to design a high-speed electric machine with weaker torque, and to make it more compact and lighter, it can be arranged that the electric machine is drive connected to the second input element of the superimposed transmission via two gear reduction stages connected in series. As a result, the gear transmission ratios of the two gear reduction stages are multiplied, resulting in a considerably higher gear transmission ratio between the rotor of the electric machine and the second input element of the superimposed transmission with the respective speed reduction and torque increase.

According to a further embodiment of the present disclosure, it can be arranged that the electric machine is located axially parallel to the output shaft of the gearbox and radially adjacent to the superimposed transmission, and that the rotor of the electric machine is drive connected to the second input element of the superimposed transmission via a gear reduction stage on the input side which is designed in the form of a planetary gear step and a downstream gear reduction stage on the output side which is designed in the form of a spur gear stage.

However, when the electric machine is arranged coaxially to the output shaft of the gearbox and axially adjacent to the superimposed transmission, the rotor of the electric machine can be drive connected to the second input element of the superimposed transmission via a gear reduction stage on the input side designed in the form of a planetary gear step and a downstream gear reduction stage on the output side also designed the form of a planetary gear step. To save axial installation space, the two planetary gear steps can be radially staggered, or to save radial installation space, they can be axially staggered.

In another form, the planetary gear step of the gear reduction stage on the input side is designed in the form of a simple planetary transmission with a sun wheel, a planet carrier supporting multiple planetary gears and a ring gear, in which the sun wheel forms the input element of the gear reduction stage on the input side which is connected non-rotatably to the rotor of the electric machine, in which the ring gear forms the intermediate element of the gear reduction stage on the input side which is fixed at the housing, and in which the planet carrier forms the output element of the gear reduction stage on the input side which is connected non-rotatably to the drive gear or the input element of the gear reduction stage on the output side. The design of the simple planetary transmission and drive connection of the transmission components combines the advantages of a few transmission components and compact measurements with an achievable gear transmission ratio of the gear reduction stage on the input side. However, in principle it is also possible to use different designs of planetary transmissions or a different drive connection of the transmission components for carrying out the gear reduction stage on the input side.

If no particular starter is available for starting the combustion engine, the combustion engine can be started in electric drive with the following steps:

opening the decoupler, provided it is designed to be passively closed, engaging the gear shifting member of the spur gear stage of the highest gear of the gearbox, closing the decoupler and simultaneously increasing the torque released from the electric machine, until the combustion engine (VM) is started, and opening the decoupler.

The fact that during start-up via the spur gear stage of the highest gear the combustion engine is push-started via the respective output shaft, results in minimal loss of torque, which should be compensated by respectively increasing the torque released from the electric machine. As a result, the start-up can be carried out fairly smooth and comfortable for the passengers.

In still another form, connecting the combustion engine to make a transition to hybrid drive or combustion operation is performed depending on the current travel speed. At a low travel speed, it is advantageous to use the process for the transition to an electrodynamic drive system (EDA) which is described in DE 10 2013 215 114 A1. However, at a higher travel speed, it is reasonable to engage an appropriate gear of the gearbox and subsequently close the decoupler so that the combustion engine can at least partially assume the load.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

In order that the disclosure may be well understood, there will now be described various forms thereof, given by way of example, reference being made to the accompanying drawings, in which:

FIG. 1*a* is an operation and circuit diagram of the hybrid drive shown in FIG. 1 in the form of a table;

FIG. 5*a* is an operation and circuit diagram of the hybrid drive shown in FIG. 5 in the form of a table;

Figure 1:
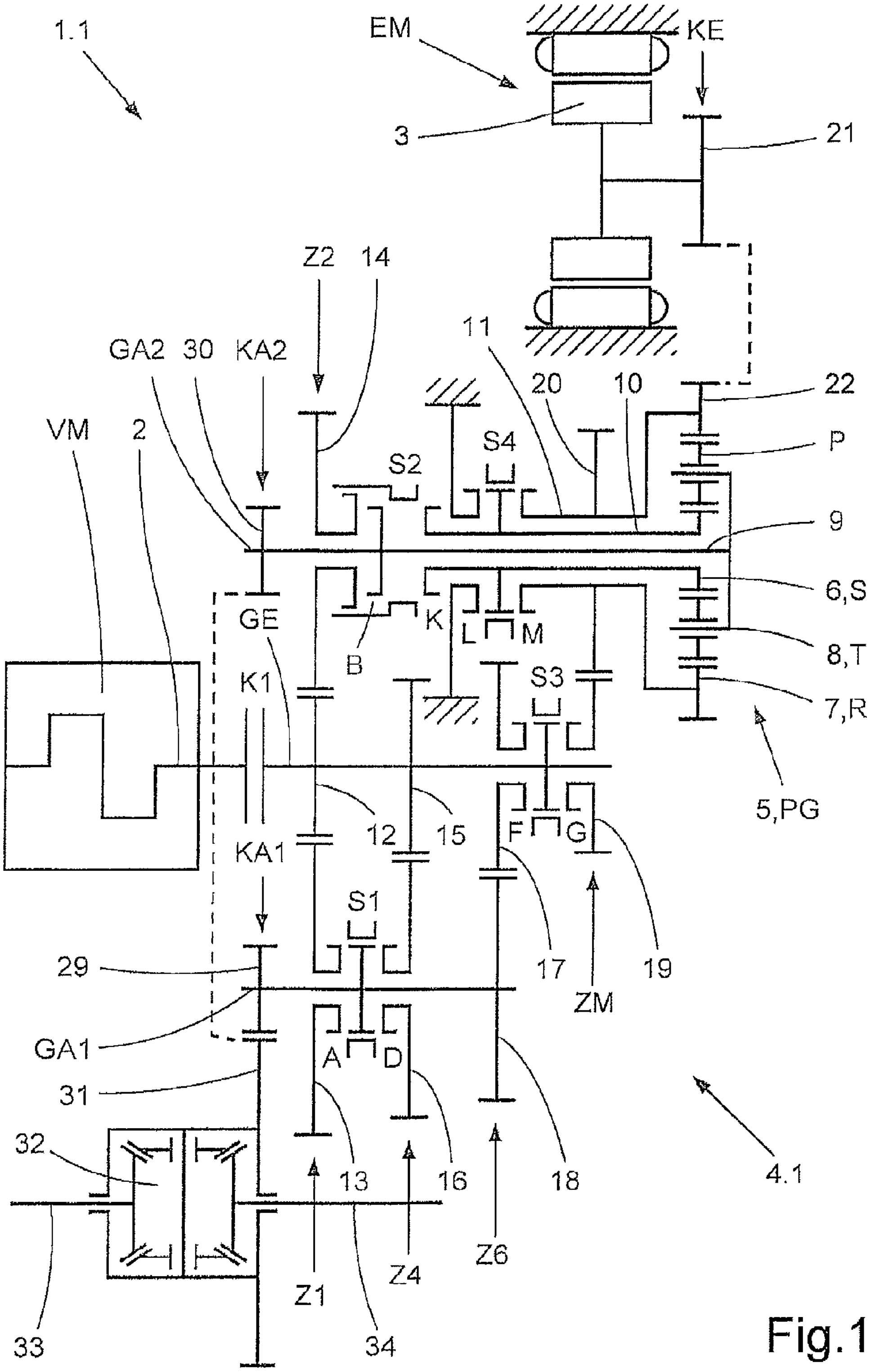
FIG. 1 is a schematic representation of a first embodiment of the present disclosure-based hybrid drive.

The drawings described herein are for illustration purposes only and are not intended to limit the scope of the present disclosure in any way.

DETAILED DESCRIPTION OF EXAMPLE EMBODIMENTS

The following description is merely exemplary in nature and is not intended to limit the present disclosure, application, or uses. It should be understood that throughout the drawings, corresponding reference numerals indicate like or corresponding parts and features.

The schematic diagram of the first embodiment of the present disclosure-based hybrid drive 1.1 shown in FIG. 1 has a combustion engine VM with a drive shaft 2, an electric machine EM with a rotor 3 that can be operated as an engine or as a generator, an automated gearbox 4.1 in countershaft design with an input shaft GE and two output shafts GA1, GA2, as well as a superimposed transmission 5 constructed in planetary design with two input elements 6, 7 and an output element 8.

On the input side, the input shaft GE of the gearbox 4.1 can be connected to the drive shaft 2 of the combustion engine VM via a decoupler designed in the form of a friction clutch K1. Inside the transmission, the input shaft GE of the gearbox 4.1 can be drive connected to the first output shaft GA1 via three selectively switchable spur gear stages Z1, Z4, Z6, and to the second output shaft GA2 via a further selectively switchable spur gear stage Z2. Each of the spur gear stages Z1, Z2, Z4, Z6 has a fixed gear 12, 15, 18 and an idler 13, 14, 16, 17. The first spur gear stage Z1 and the second spur gear stage Z2 are arranged in a mutual gear level and utilize a mutual fixed gear 12 which is mounted non-rotatably on the input shaft GE. The fixed gear 15 of the fourth spur gear stag Z4 is also mounted non-rotatably on the input shaft GE. The idlers 13, 14, 16 of these three spur gear stages Z1, Z2, Z4 are swivel-mounted on the respectively associated output shafts GA1, GA2 and can be connected non-rotatably with said output shafts via an associated gear shifting member A, B, D. In the sixth spur gear stage Z6, the respective idler 17 is swivel-mounted on the input shaft GE and can be connected non-rotatably with said input shaft via an associated gear shifting member F. The fixed gear 18 of the sixth spur gear stage Z6 is mounted non-rotatably on the first output shaft GA1. The gear shifting members A, D of the first and fourth spur gear stage Z1, Z4 are combined in a dual shift element S1. Because of the four spur gear stages Z1, Z2, Z4, Z6, the gearbox 4.1 has initially four switchable gears G1, G2, G4, G6. Via a respective output constant KA1, KA2, which comprises an output gear 29, 30 and a mutual crown gear 31, the two output shafts GA1, GA2 of the gearbox 4.1 are drive connected to an axle differential 32, from which two drive shafts 33, 34 lead to drive gears (not shown in FIG. 1) of the respective vehicle axle.

The superimposed transmission 5 is arranged coaxially above the free end 9 of the second output shaft GA2 facing away from the combustion engine VM and designed in the form of a simple planetary transmission PG with a sun wheel S, a planet carrier T supporting multiple planetary gears P and a ring gear R.

The sun wheel S of the planetary transmission PG is connected non-rotatably to a first hollow shaft 10, which is arranged coaxially above the second output shaft GA2 of the gearbox 4.1 and, via a coupling-switching element K, it can be connected non-rotatably to the idler of the directly axially adjacent second spur gear stage Z2. The coupling-switching element K and the gear shifting member B of the second spur gear stage Z2 are combined in a dual shift element S2.

When the decoupler K1 is closed and the coupling switching element K is engaged, the drive shaft 2 of the combustion engine VM is drive connected to the hollow shaft 10 via the input shaft GE and the spur gear stage Z2 of the second gear. Therefore, the sun wheel S of the planetary transmission PG forms the first input element 6 of the superimposed transmission 5. The planet carrier T of the planetary transmission PG is connected non-rotatably to the second output shaft GA2 of the gearbox 4.1 and thus forms the output element 8 of the superimposed transmission 5.

In the hybrid drive 1.1 shown in FIG. 1, the electric machine EM is arranged axially parallel to the second output shaft GA2 of the gearbox 4.1 and the planetary transmission PG. Via a gear reduction stage KE designed in the form of a spur gear stage with a drive gear 21 and an output gear 22, the rotor 3 of the electric machine EM is drive connected to the ring gear R of the planetary transmission PG. Therefore, the ring gear R of the planetary transmission PG forms the second input element 7 of the superimposed transmission 5. The gear reduction stage KE has the effect that the speed of the electric machine EM is reduced and its torque is respectively increased. As a result, it is possible to increase the rotation of the electric machine EM and decrease the torque which, in turn, results in the fact that the electric machine EM can have a smaller and lighter design than in the case when it is directly connected to the second input element 7 of the superimposed transmission 5.

The hollow shaft 10, which is connected non-rotatably to the sun wheel S of the planetary transmission PG, can be fixed in the housing via a interlock switching device L and can be connected non-rotatably to the ring gear R of the planetary transmission PG via a bridging contact member M. The interlock switching device L and the bridging contact member M are combined in a dual shift element. These two shift elements L, M result in two gear steps E1, E2 for electric drive in which the motor vehicle is driven by the electric machine EM via the second output shaft GA2 and the second output constant KA2. When the interlock switching device L is engaged and, as a result, the sun wheel is fixed in the housing, the lower first gear step E1 of electric drive is generated with a gear transmission ratio $i_{E1}=i_{KE}*(1-i_{01}^{-1})$, wherein $i_{KE}$ represents the gear transmission ration of the spur gear stage KE and $i_{01}$ the stationary gear ratio of the planetary transmission PG. When the bridging contact member M, in which the planetary transmission PG is blocked within and revolves in the block, is engaged, the higher second gear step E2 of electric drive is generated with a gear transmission ratio of $i_{E2}=i_{KE}$. In addition to the superimposed transmission functioning to drive connect the combustion engine VM and the electric machine EM to the second output shaft GA2 of the gearbox 4.1, the planetary transmission PG also functions as a two-speed gearbox for electric drive.

The present disclosure also provides for a coupler spur gear stage ZM, which comprises a drive gear 19 and an output gear 20 and which can be switched by means of a second coupling-switching element G. By means of said coupler spur gear stage ZM, the input shaft GE of the gearbox 4.1 can be drive connected to the second input element 7 of the superimposed transmission 5. In the present case, the drive gear 19 of the coupler spur gear stage ZM is designed in the form of an idler, which is swivel-mounted on the input shaft GE and via the coupling-switching element G it can be connected non-rotatably to said input shaft GE. The coupling-switching element G is combined with the gear shifting member F of the sixth spur gear stage Z6 in a dual shift element S3. Therefore, the output gear 20 of the coupler spur gear stage ZM is designed in the form of a fixed gear, which is connected non-rotatably on the second hollow shaft 11, which is arranged coaxially above the first hollow shaft 10 and connected non-rotatably to the ring gear R of the planetary transmission PG and to a coupling half of the bridging contact member M.

On the one hand, it is possible with the switchable coupler spur gear stage ZM, to provide an output-free drive connection between the combustion engine VM and the electric machine EM which, during a standstill of the vehicle or during a driving operation when the gearbox 4.1 is shifted to neutral, i.e., in driveless propulsion phases, can be utilized for charging an electric energy storage device by means of the electric machine EM used as generator, or for starting the combustion engine VM by means of the electric machine EM, which is then used as a motor.

On the other hand, it is possible with the drive connection via the coupler spur gear stage ZM to use the gear steps E1, E2 for electric drive, which can be switched via the interlock switching device L and the bridging contact member M, also for combustion operation, making it possible to save two spur gear stages of the gearbox 4.1 and the associated installation space. In the present case, the gear transmission ratio $i_{ZM}$ of the coupler spur gear stage ZM is selected in such a way that a gear transmission ratio $i_{PG}=1-i_{01}^{-1}$ of the planetary transmission PG with engaged interlock switching device L would result in the third gear G3 and a gear transmission ratio $i_{PG}=1$ of the planetary transmission PG with engaged bridging contact member M would result in the fifth gear G5 for combustion operation.

In the present case, the gear shifting members A, B, D, F of the gearbox 4.1 and the coupling-switching elements G, K, the interlock switching device L and the bridging contact member M are designed in the form of unsynchronized claw clutches because, during a switching operation, they can be respectively synchronized by means of the electric machine EM and/or the combustion engine VM.

The possible operation modes of the hybrid drive 1.1 are summarized in the table of FIG. 1*a*, in which for the combustion engine VM the respectively effective gear G1, G2, G3, G4, G5, G6 of the gearbox 4.1 and the planetary transmission PG is indicated, for the electric machine EM the respectively effective gear step E1, E2 of the planetary transmission PG and the gear reduction stage KE, and for the dual shift elements S1, S2, S3, S4 the respectively engaged shift element A, B, D, F, G, K, L, M. Because of the fact that the gearbox 4.1 has no inverter, reversing and maneuvering in reverse with the present disclosure-based hybrid drive 1.1 can be performed only in electric drive in the first gear step E1 by reversing the direction of rotation of the electric machine EM. In addition, the table of FIG. 1*a* indicates exemplary values for the gear transmission ratios i of gear step E1, E2 of the electric drive and the gears G1-G6 of the combustion operation, as well as the gear ratios phi occurring between them.

In the operation mode EDA operation, which is primarily used for an abrasion-free start, the planetary transmission PG is effective as a superimposed transmission 5, and the torques and speeds of the combustion engine VM and the electric machine EM are superimposed in the superimposed transmission 5 and transferred to the second output shaft GA2. By closing the decoupler K1 and engaging the coupling-switching element K, the drive shaft 2 of the combustion engine VM is drive connected via the input shaft GE, the spur gear stage Z2 of the second gear G2 and the hollow shaft 10 to the sun wheel S of the planetary transmission PG, which is effective as the first input element 6 of the superimposed transmission 5. Via the gear reduction stage KE, the rotor 3 of the electric machine EM is already drive connected to the ring gear R of the planetary transmission PG, which is effective as second input element 7 of the superimposed transmission 5.

In the same way, the planet carrier T of the planetary transmission, which forms the output element 8 of the superimposed transmission 5, is connected permanently non-rotatably to the second output shaft GA2 of the gearbox 4.1.

Analogous to the operation of the electrodynamic drive system (EDA) described in DE 199 34 696 A1, the abrasion-free start takes place in that, while the combustion engine VM maintains a largely constant speed, the electric machine EM is initially controlled in generator operation where the drag torque increases until the rotor reaches a standstill and then accelerated in engine operation with reversed direction of rotation. This can take place until the transmission components R, S, T of the planetary transmission are synchronized, whereupon the bridging contact member M is closed and the EDA operation is concluded.

However, the EDA operation can also be terminated prematurely in that the gear shifting member A of the spur gear stage Z1 of the first gear G1 is engaged when as a result of accelerating the vehicle said gear shifting member A reaches synchronization. Depending on the concrete gear transmission ratios, the premature termination of the EDA operation can reduce or even completely inhibit the engine operation of the electric machine EM, which is especially advantageous when the electric energy storage device is almost completely discharged.

In electric drive (E driving), the planetary transmission PG is effective as two-speed gearbox, and the two gear steps E1, E2 can be switched via the interlock switching device L and the bridging contact member M. With the present design and arrangement of the superimposed transmission 5, the gear transmission ratio of the planetary transmission PG, which is effective when the interlock switching device L is closed in the lower first gear step E1 of electric drive, ranges at $i_{PG}=1.625$ with an assumed stationary gear ratio of the planetary transmission of $i_{01}=-1.60$. However, the gear transmission ratio of the planetary transmission PG, which is effective when the bridging contact member M is closed in the higher second gear step E2 of electric drive, amounts to one ($i_{PG}=1$).

To determine the overall gear transmission ratio of the gear steps E1, E2 of electric drive, these gear transmission ratios $i_{PG}$ have to be multiplied with the gear transmission ratio $i_{KE}$ of the upstream gear reduction stage KE, which in the present case has been assumed in an exemplary manner with the value $i_{KE}$=4.73.

In combustion operation (V driving), the gears G1, G2, G4, G6 are switched via the gear shifting members A, B, D, F of the associated spur gear stages Z1, Z2, Z4, Z6 of the gearbox 4.1. However, the gears G3 and G5 are switched via the coupling-switching element G of the coupler spur gear stage ZM and the interlock switching device L or the bridging contact member M of the superimposed transmission 5. To achieve the respective gear transmissions of the third and fifth gear G3, G5, the gear transmission ratio $i_{ZM}$ of the coupler spur gear stage ZM in the present case has been arranged in an exemplary manner to the value $i_{ZM}$=3.30.

In hybrid drive (V+E driving), the electric machine EM can basically be drive connected to the second output shaft GA2 of the gearbox 4.1 via anyone of the two gear steps E1, E1 of the planetary transmission PG, i.e., with a fixed transmission ratio. However, the fact that the gears G3, G5 are switched via the coupler spur gear stage ZM and the planetary transmission PG involves the restriction that the electric machine EM with an engaged third gear G3 can be drive connected only via the first gear step E1 of electric drive and with an engaged fifth gear G5, it can be drive connected only via the second gear step E2 of electric drive. In hybrid drive, the electric machine EM can alternatively be run as a motor for a boost operation to support the combustion engine VM or as a generator to charge an electric energy storage device.

With the hybrid drive 1.1 shown in FIG. 1, it is possible independent of the output via the coupler spur gear stage ZM to perform a charge of an electric energy storage device, during which the electric machine EM operated as a generator is driven by the combustion engine VM, and to start the combustion engine VM by means of the electric machine EM, which is then operated as a motor, during a vehicle standstill, as well as while driving, for example, in driveless propulsion phases. It is only required to close the decoupler K1 and to engage the associated second coupling-switching element G.

Figure 2:
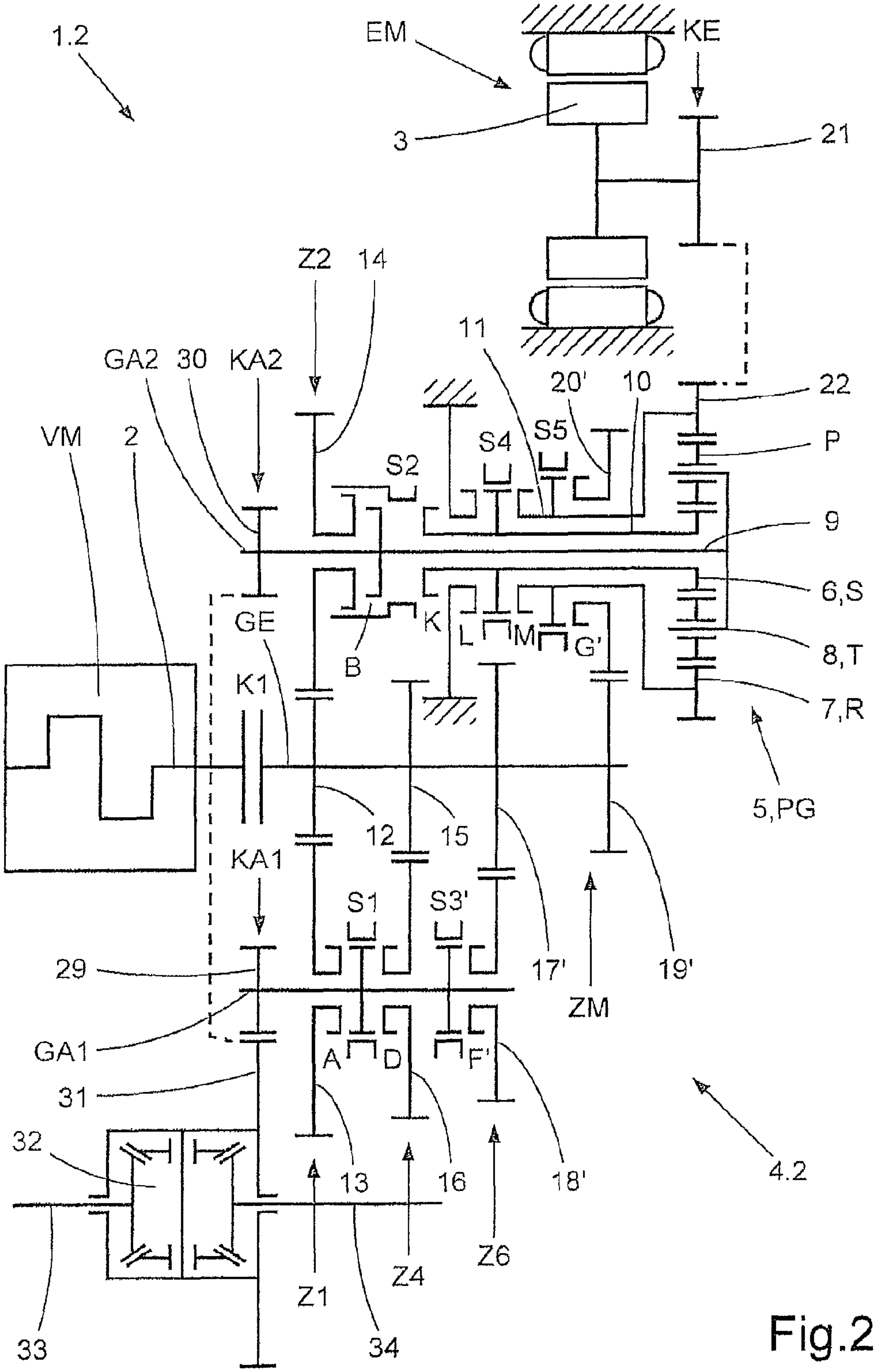
FIG. 2 is a schematic representation of a second embodiment of a present disclosure-based hybrid drive.

A second embodiment of the present disclosure-based hybrid drive 1.2, which is shown in a schematic diagram in FIG. 2, differs from the first embodiment of the hybrid drive 1.1 shown in FIG. 1, although it has identical functions, by transposing the idlers and fixed gears 17', 18', 19', 20' of the sixth spur gear stage Z6 and the coupler spur gear stage ZM. In the present case, the fixed gear 17' of the sixth spur gear stage Z6 is mounted non-rotatably on the input shaft GE, and the respective idler 18' is swivel-mounted on the first output shaft GA1 and can be connected non-rotatably to said output shaft via the associated gear shifting member F'. As a result, the gear shifting member F' of the sixth spur gear stage Z6 is a component of a single shift element S3'.

The drive gear 19' of the coupler spur gear stage ZM is now designed in the form of a fixed gear, which is mounted non-rotatably on the input shaft GE. The output gear 20' of the coupler spur gear stage ZM is designed in the form of an idler, which is swivel-mounted on the second hollow shaft 11 and which can be connected non-rotatably to said hollow shaft 11 via the coupling-switching element G'. As a result, the coupling-switching element G' also forms a single shift element S5.

In contrast to the hybrid drive 1.1 shown in FIG. 1, because of the respectively modified drive connection of the sixth spur gear stage Z6 and the coupler spur gear stage ZM, these are no longer driven in electric drive via the first output shaft GA1 or the second hollow shaft 11 so that the associated drag losses are eliminated. However, the advantage of the higher transmission efficiency in electric drive has to be weighed against the disadvantage of a more complex shift device with two single shift elements S3', S5. In consideration of the modified shift elements F'; S3' and G'; S5, it is also possible to use the operation and circuit diagram of FIG. 1*a* for the hybrid drive 1.2 shown in FIG. 2.

Figure 3:
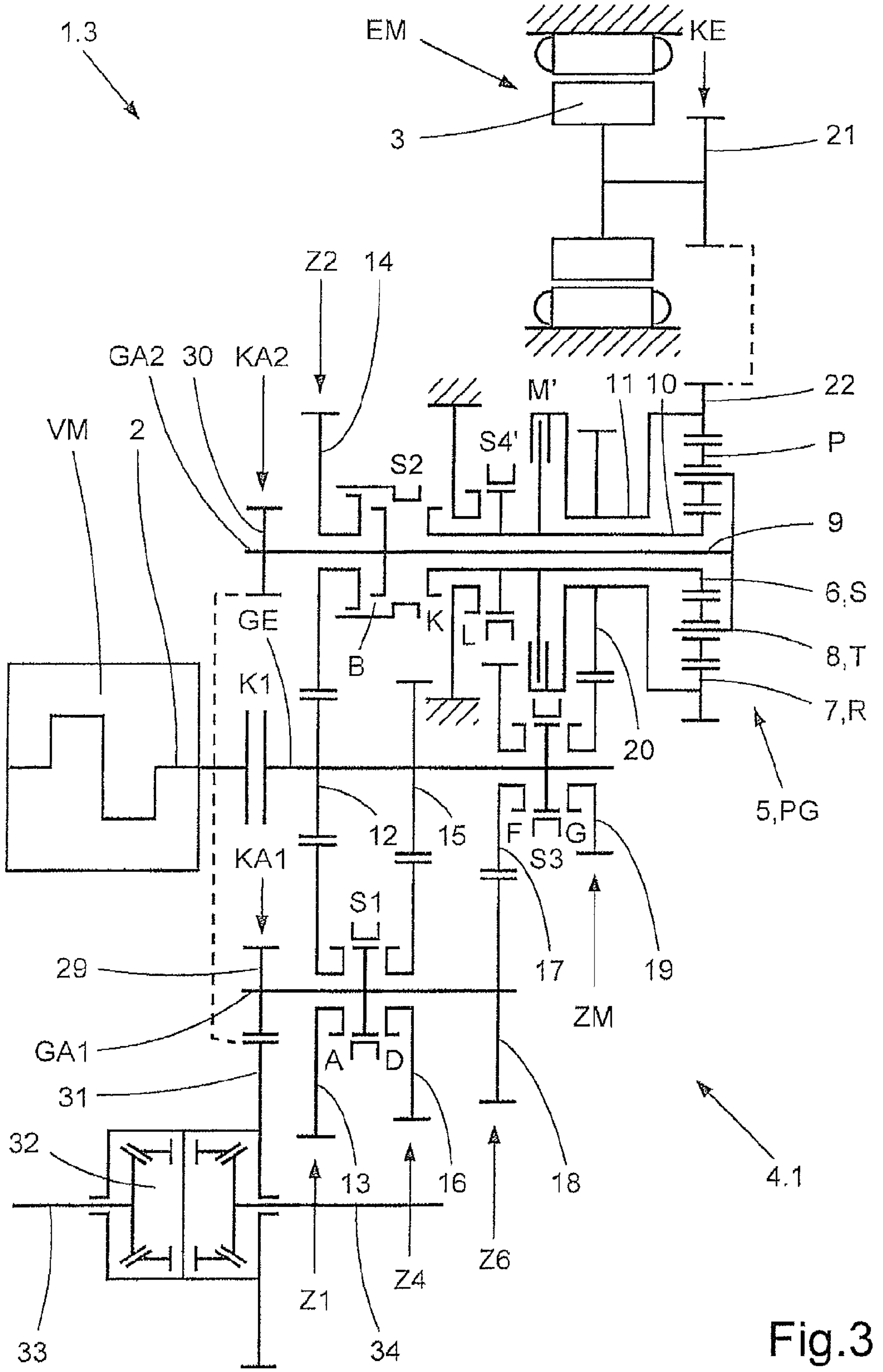
FIG. 3 is a schematic representation of a third embodiment of the present disclosure-based hybrid drive.

A third embodiment of the present disclosure-based hybrid drive 1.3, which is shown in a schematic diagram in FIG. 3, differs from the hybrid drive 1.1 shown in FIG. 1, although it has almost identical functions, by designing the bridging contact member M' in the form of a friction clutch.

Designing the bridging contact member M' in the form of a friction clutch allows traction shifts in electric drive to be performed as power shifts. In a traction upshift (switching from gear step E1 to gear step E2), the bridging contact member M' is closed until the interlock switching device L is largely load-free. After disengaging the interlock switching device L, the bridging contact member M' is completely closed. In a traction downshift (switching from gear step E2 to gear step E1), the bridging contact member M' is opened up to the transition to slip operation, whereby because of the load relief the speed of the electric machine EM is raised. When the synchronous speed is reached at the interlock switching device L, it is engaged and then the bridging contact member M' is completely opened. Because of the fact that the bridging contact member M' is designed in the form of a friction clutch, the interlock switching device L inevitably forms a single shift element S4'. In consideration of the modified shift elements bridging contact member M' and interlock switching device L, the operation and circuit diagram of the hybrid drive shown in FIG. 1*a* can be used also for the hybrid drive 1.3.

Figure 4:
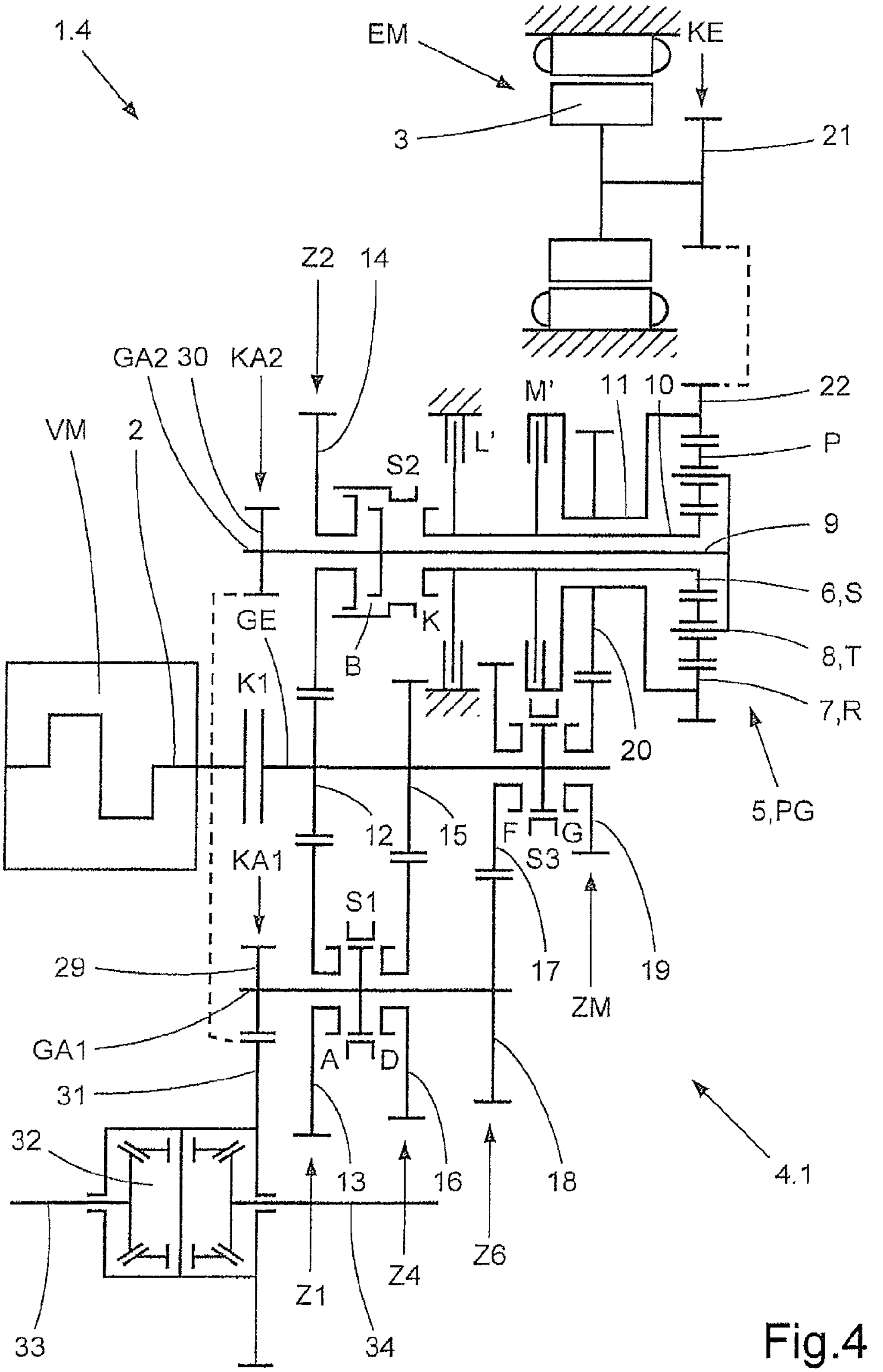
FIG. 4 is a schematic representation of a fourth embodiment of the present disclosure-based hybrid drive.

A fourth embodiment of the present disclosure-based hybrid drive 1.4, which is shown in a schematic diagram in FIG. 4, is based on the third embodiment of the hybrid drive 1.3 shown in FIG. 3. Compared to the latter, here also the interlock switching device L' is designed in the form of a friction clutch. As a result, it is possible to perform traction shifts, as well as boost circuits in electric drive as power shifts. In these power shifts, with a respective time overlap, the shift element (interlock switching device L' or bridging contact member M') of the load gear step (gear step E1 or gear step E2) effective prior to shifting is opened and the shift element M' or L' of the target gear step (gear step E2 or gear step E1) effective after shifting is closed. In consideration of the modified shift elements L' and M', it is also possible to use the operation and circuit diagram of FIG. 1*a* for the hybrid drive 1.4 shown in FIG. 4.

Figure 5:
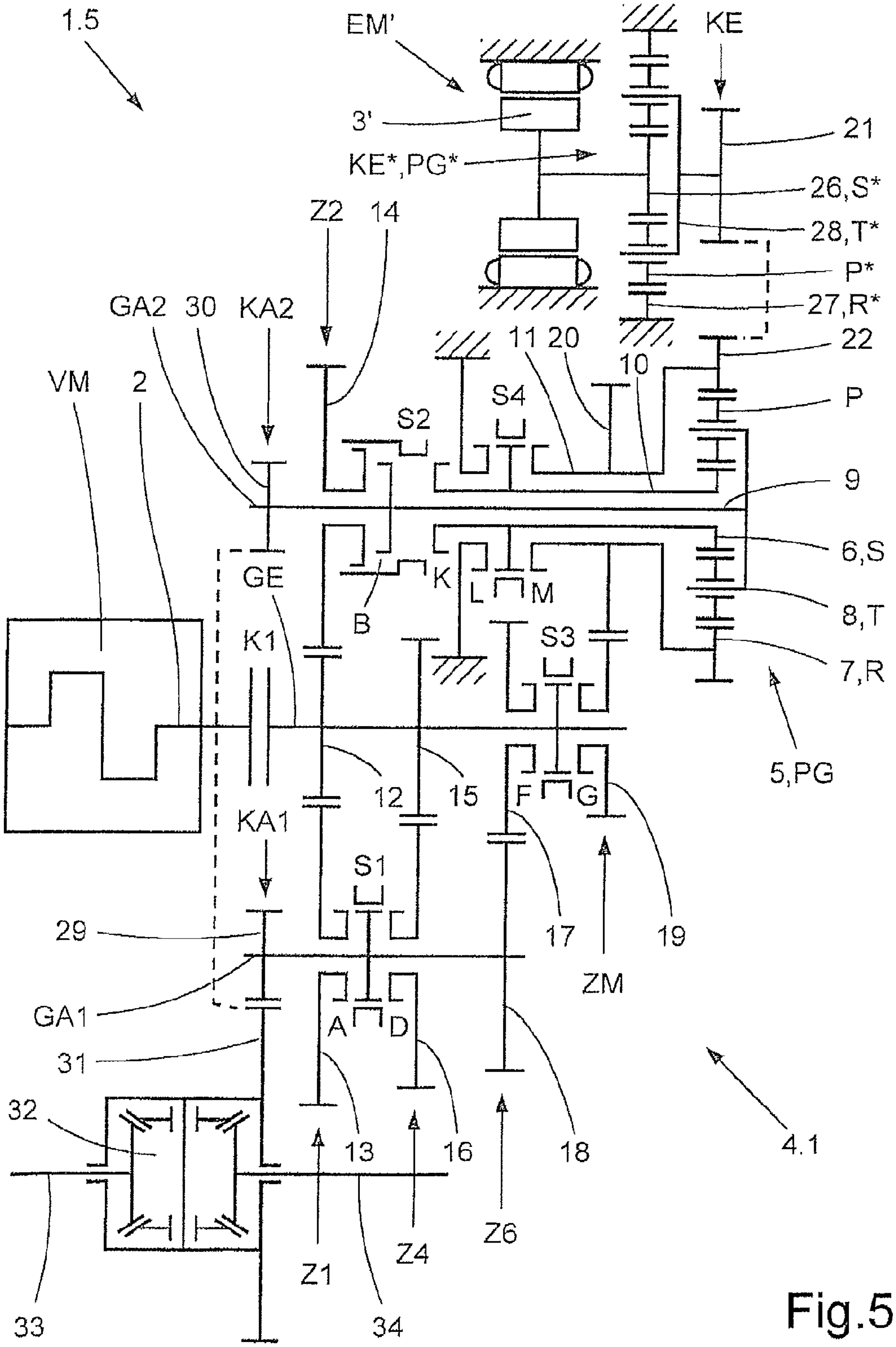
FIG. 5 is a schematic representation of a fifth embodiment of the present disclosure-based hybrid drive.

In contrast to the first embodiment of the hybrid drive 1.1 shown in FIG. 1, the electric machine EM' in a fifth embodiment of the hybrid drive 1.5, which is shown in FIG. 5 and has identical functions, is drive connected to the second input element 7 of the superimposed transmission 5 via two gear reduction stages KE, KE* connected in series. For this purpose, a second gear reduction stage KE* designed in the form of a planetary transmission stage PG* is arranged between the rotor 3' of the electric machine EM' and the drive gear 21 of the previously available gear reduction stage KE designed in the form of a spur gear stage. This planetary transmission stage PG* is designed in the form of a simple planetary transmission with a sun wheel S*, a planet carrier T*supporting multiple planetary gears P* and a ring gear R*, in which the sun wheel S* forms the input element 26 of the gear reduction stage KE*, which is connected non-rotatably to the rotor 3' of the electric machine EM', in which the ring gear R* forms the intermediate element 27 of the second gear reduction stage KE*, which is fixed at the housing, and in which the planet carrier T* forms the output element 28 of the second gear reduction stage KE*, which is connected non-rotatably to the drive gear 21 of the spur gear stage KE.

By means of the second gear reduction stage KE*, the speed of the electric machine EM' is further reduced and its torque is respectively increased, so that an electric machine EM' with extremely high speed and a weaker torque can be produced, which is more compact and lighter. In the present drive connection, the gear transmission ratio of the second gear reduction stage KE* corresponds to the equation $i_{KE}*=1-i_{03}$, wherein $i_{03}$ represents the stationary rear ratio of the planetary transmission PG*. Therefore, when the interlock switching device L is engaged, the gear transmission ratio of the first gear step E1 of electric drive amounts to $i_{E}1=(1-i_{03})*i_{KE}*(1-i_{01}^{-1})$, and when the bridging contact member M is engaged, the gear transmission ratio of the second gear step E2 of electric drive amounts to $i_{E2}=(1-i_{03})*i_{KE}$.

Except for the gear transmission ratios for gear steps E1, E2 of electric drive, the respective operation and circuit diagram of the hybrid drive 1.5 shown in FIG. 5, which is indicated in the table of FIG. 5*a*, is identical with the diagram shown in the table of FIG. 1*a*. To determine the gear transmission ratios of gear steps E1, E2 of the electric drive, the value $i_{03}=-1.60$ was assumed for the stationary gear ratio $i_{03}$ of the planetary transmission PG* of the second gear reduction stage KE*.

Figure 6:
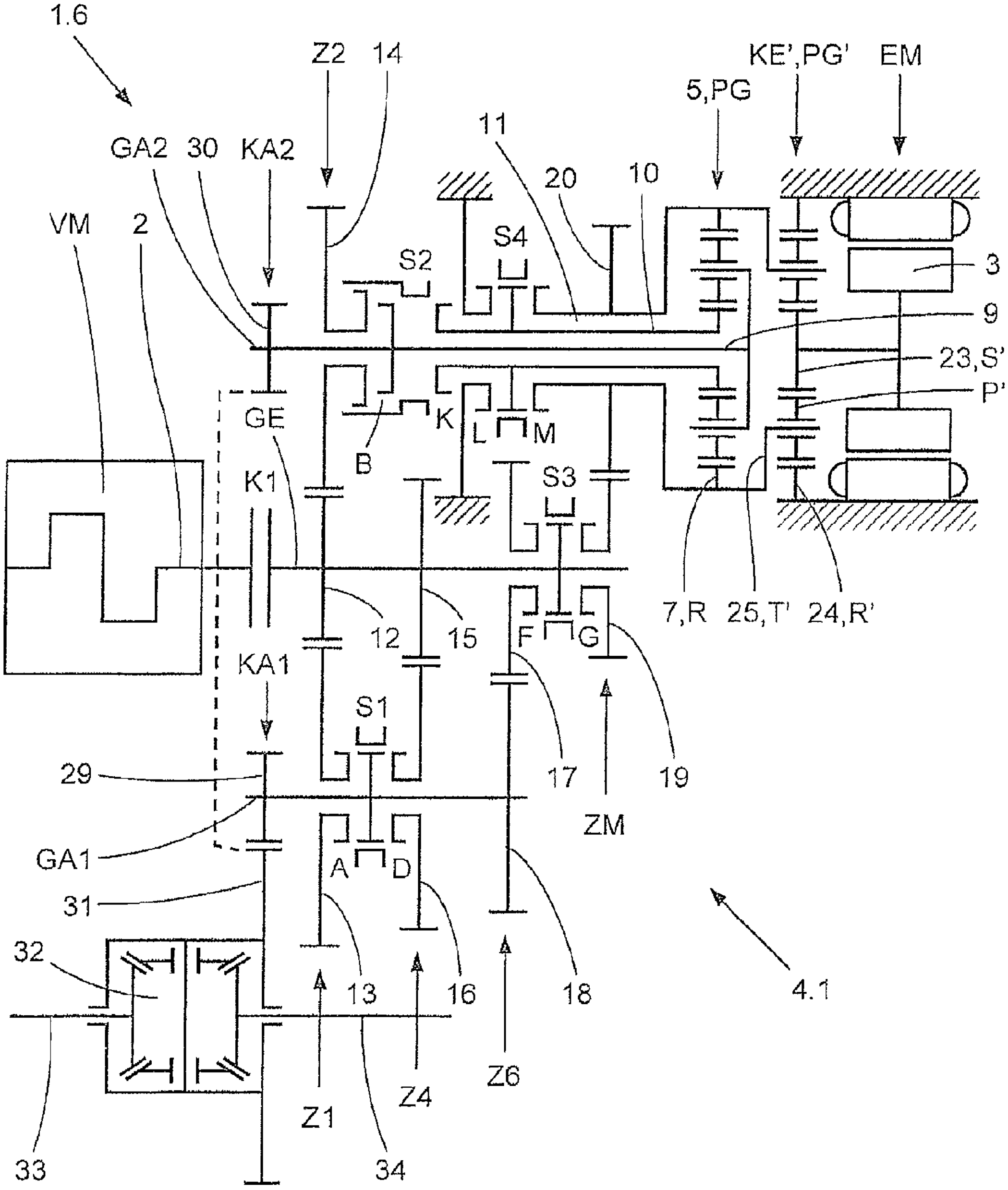
FIG. 6 is a schematic representation of a sixth embodiment of a hybrid drive according to the present disclosure.

A sixth embodiment of the present disclosure-based hybrid drive, which is shown in a schematic diagram in FIG. 6 and which has identical functions, differs from the first embodiment of the hybrid drive 1.1 shown in FIG. 1 in that the electric machine EM is arranged coaxially to the second output shaft GA2 of the gear box 4.1 and axially adjacent to the superimposed transmission 5. The rotor 3 of the electric machine EM, in turn, is drive connected to the second input element 7 of the superimposed transmission 5 via a gear reduction stage KE'. The gear reduction stage KE' is designed in the form of a simple planetary transmission PG' with a sun wheel S', a planet carrier T' supporting multiple planetary gears P' and a ring gear R, and is arranged axially between the electric machine EM and the superimposed transmission 5. The sun wheel S' of the planetary transmission PG' forms the input element 23 of the gear reduction stage KE' and is connected non-rotatably to the rotor 3 of the electric machine EM. The ring gear R' of the planetary transmission PG' forms the intermediate element 24 of the second gear reduction stage KE' and is fixed at the housing. The planet carrier T' of the planetary transmission PG' forms the output element 25 of the gear reduction stage KE' and is connected non-rotatably to the ring gear R of the planetary transmission PG, which forms the second input element 7 of the superimposed transmission 5.

In this drive connection of the planetary transmission PG', the gear transmission ratio of the gear reduction stage KE' corresponds to the equation $i_{KE}'=1-i_{02}$, wherein $i_{02}$ represents the stationary gear ratio of the planetary transmission PG'. When the value $i_{02}=-3.73$ is assumed for the stationary gear ratio of the planetary transmission PG', it is possible to use for the hybrid drive 1.6 shown in FIG. 6 the operation and circuit diagram shown in the table of FIG. 1*a*, without making any changes.

Figure 7:
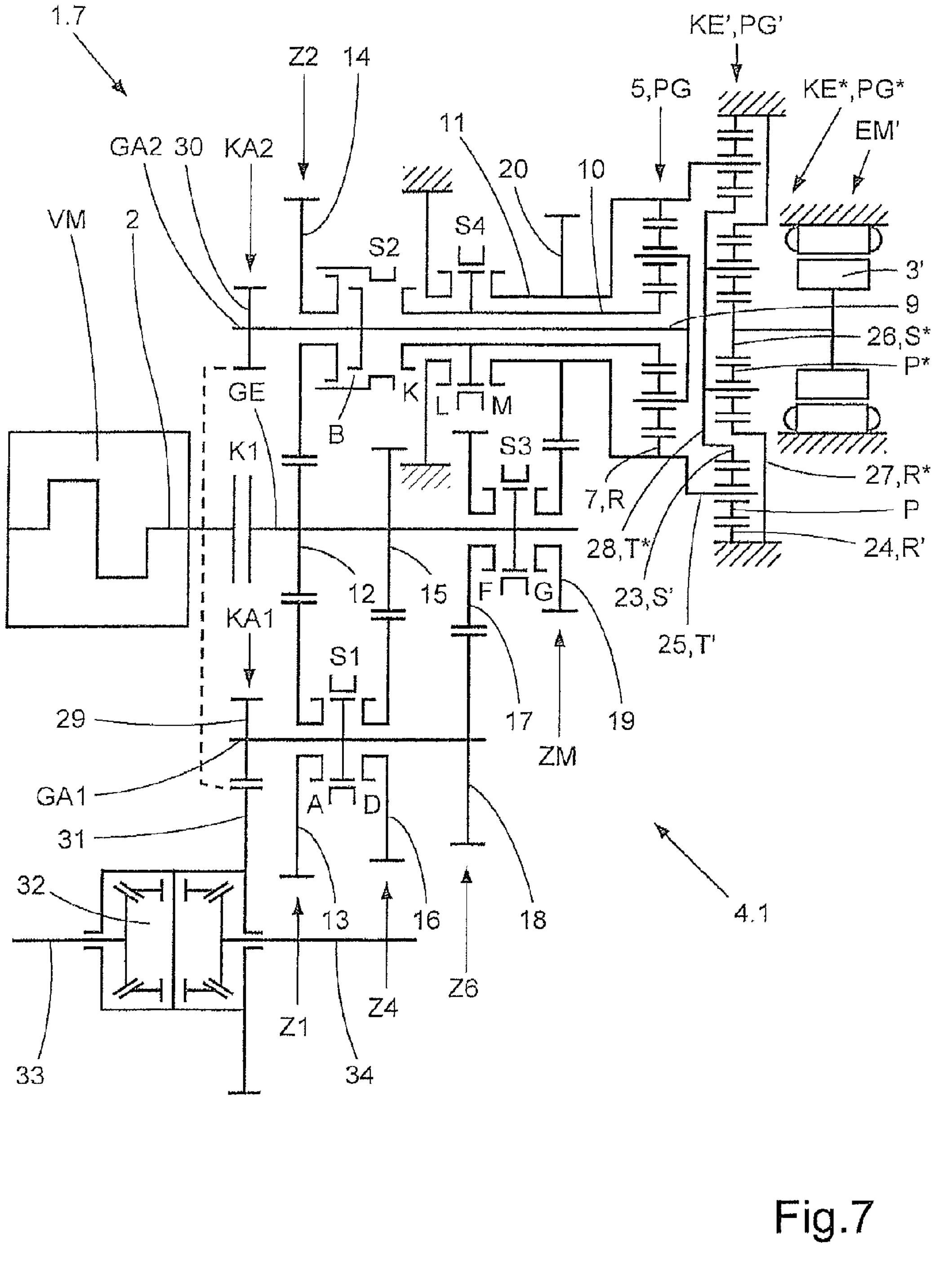
FIG. 7 is a schematic representation of a seventh embodiment of the present disclosure-based hybrid drive.

In contrast to the sixth embodiment of the hybrid drive 1.6 shown in FIG. 6, analogous to the fifth embodiment of the hybrid drive 1.5, which is shown in FIG. 5 and has identical functions, the electric machine EM' of a seventh embodiment of the hybrid drive shown in FIG. 7 is drive connected to the second input element 7 of the superimposed transmission 5 via two gear reduction stages KE', KE* connected in series. For this purpose, a second gear reduction stage KE* designed in the form of a planetary transmission stage PG* is arranged between the rotor 3' of the electric machine EM' and the input element 23 of the previously available gear reduction stage KE' designed in the form of a planetary transmission stage PG'. Said planetary transmission stage PG* is designed in the form of a simple planetary transmission with a sun wheel S*, a planet carrier T* supporting multiple planetary gears P* and a ring gear R*, in which the sun wheel S* forms the input element 26 of the second gear reduction stage KE*, which is connected non-rotatably to the rotor 3' of the electric machine EM', in which the ring gear R* forms the intermediate element 27 of the second gear reduction stage KE*, which is fixed in the housing, and in which the planet carrier T* form the output element 28 of the second gear reduction stage KE*, which is connected non-rotatably to the input element 23 of the first gear reduction stage KE'.

In the present case, in order to save axial installation space, the planetary transmission PG* of the second gear reduction stage KE* is arranged radially within the planetary transmission PG' of the first gear reduction stage KE'. However, to save radial installation space, the planetary transmission PG* of the second gear reduction stage KE* could also be arranged axially between the electric machine EM' and the planetary transmission PG' of the first gear reduction stage KE'.

In this embodiment of the hybrid drive, when the interlock switching device L is engaged, the gear transmission ratio of the first gear step E1 of electric drive 1.7 amounts to $i_{E1}=(1-i_{03})*(1-i_{02})*(1-i_{01}^{-1})$, and when the bridging contact member M is engaged, the gear transmission ratio of the second gear step E2 of electric drive amounts to $i_{E2}=(1-i_{03})*(1-i_{02})$. When the stationary gear ratio of the two planetary transmissions PG', PG* amounts to the value−3.73 (for example, $i_{02}=-1.60$, $i_{03}=-3.73$), it is possible to use for the hybrid drive 1.7 shown in FIG. 7 the operation and circuit diagram shown in the table of FIG. 5*a*, without making any changes.

REFERENCE NUMERALS

1.1-1.7 hybrid drive
2 drive shaft
3 rotor of electric machine EM
3' rotor of electric machine EM'
4.1, 4.2 gearbox
5 superimposed transmission
6 first input element of the superimposed transmission 5
7 second input element of the superimposed transmission 5
8 output element of the superimposed transmission 5
9 free end of the first output shaft GA2
10 first hollow shaft, hollow shaft of input element 6
11 second hollow shaft, hollow shaft of input element 7
12 fixed gear of spur gear stage Z1 and Z2
13 idler of spur gear stage Z1
14 idler of spur gear stage Z2
15 fixed gear of spur gear stage Z4
16 idler of spur gear stage Z4
17, 18' idler of spur gear stage Z6
17', 18 fixed gear of spur gear stage Z6
19 drive gear, idler of coupler spur gear stage ZM
19' drive gear, fixed gear of coupler spur gear stage ZM
20 output gear, fixed gear of coupler spur gear stage ZM
20' output gear, idler of coupler spur gear stage ZM
21 drive gear of gear reduction stage KE
22 output gear of gear reduction stage KE
23 input element of gear reduction stage KE'

24 intermediate element of gear reduction stage KE'
25 output element of gear reduction stage KE'
26 input element of gear reduction stage KE*
27 intermediate element of gear reduction stage KE*
28 output element of gear reduction stage KE*
29 first output gear
30 second output gear
31 crown gear
32 axle differential
33 first drive shaft
34 second drive shaft
A gear shifting member of spur gear stage Z1
B gear shifting member of spur gear stage Z2
D gear shifting member of spur gear stage Z4
E1, E2 gear steps of electric machine EM, EM'
EDA electrodynamic drive system
EM, EM' electric machine
F, F' gear shifting member of spur gear stage Z6
G, G' second coupling-switching element
G1-G6 gears
GA1 first output shaft of gearbox 4.1, 4.2
GA2 second output shaft of gearbox 4.1, 4.2
GE input shaft of gearbox 4.1, 4.2
i gear transmission ratio
$i_{01}$ stationary gear ratio of planetary transmission PG
$i_{02}$ stationary gear ratio of planetary transmission PG'
$i_{03}$ stationary gear ratio of planetary transmission PG*
$i_{E1}$ gear transmission ratio of gear step E1
$i_{E2}$ gear transmission ratio of gear step E2
$i_{KE}$ gear transmission ratio of gear reduction stage KE
$i_{KE}$' gear transmission ratio of gear reduction stage KE'
$i_{KE}$* gear transmission ratio of gear reduction stage KE*
$i_{PG}$ gear transmission ratio of planetary transmission PG
$i_{ZM}$ gear transmission ratio of coupler spur gear stage ZM
K first coupling-switching element
KE gear reduction stage of EM, EM', spur gear stage
KE' gear reduction stage of EM, EM', planetary gear stage
KE* gear reduction stage of EM, planetary gear stage
K1 decoupler, friction clutch
KA1 first output constant of gearbox 4.1, 4.2
KA2 second output constant of gearbox 4.1, 4.2
L. L' locking element
M, M' bridging contact member
P planetary gear of planetary transmission PG
P' planetary gear of planetary transmission PG'
P* planetary gear of planetary transmission PG*
PG planetary transmission
PG' planetary transmission'
PG* planetary transmission*
phi gear ratio
R ring gear of planetary transmission PG
R' ring gear of planetary transmission PG'
R* ring gear of planetary transmission PG*
S sun wheel of planetary transmission PG
S' sun wheel of planetary transmission PG'
S* sun wheel of planetary transmission PG*
S1 dual shift element of gearbox 4.1, 4.2
S2 dual shift element of gearbox 4.1, 4.2
S3 dual shift element of gearbox 4.1
S3' single shift element of gearbox 4.2
S4 dual shift element of superimposed transmission 5
S4' single shift element of superimposed transmission 5
S5 single shift element of superimposed transmission 5
T planet carrier of planetary transmission PG
T' planet carrier of planetary transmission PG'
T* planet carrier of planetary transmission PG*
VM combustion engine
Z1 spur gear stage for ear G1
Z2 spur gear stage for ear G2
Z4 spur gear stage for ear G4
Z6 spur gear stage for ear G6
ZM coupler spur gear stage

What is claimed is:

1. A hybrid drive of a motor vehicle, comprising:

a combustion engine with a drive shaft;

an electric machine with a rotor configured to operate as a motor or a generator;

an automated gearbox comprising an input shaft and at least one output shaft, the input shaft connected to said at least one output shaft via multiple selectively switchable spur gear stages; and a superimposed transmission comprising a first and second input elements, and an output element, the first input element connected non-rotatably to a first hollow shaft arranged coaxially with said at least one output shaft, wherein the input shaft is connected via a controllable decoupler or directly to the drive shaft, and the superimposed transmission is arranged coaxially with a free end of said at least one output shaft, wherein the first hollow shaft is connected non-rotatably to an idler of a directly adjacent axial spur gear stage via a first coupling-switching element, and the first hollow shaft is fixed at a housing via an interlock switching device, and via a bridging contact member the first hollow shaft is connected non-rotatably to the second input element or to the output element, wherein the second input element of the superimposed transmission is permanently connected to the rotor of the electric machine, and the output element of the superimposed transmission is connected non-rotatably to said at least one output shaft, and wherein the input shaft of the gearbox is connected to the second input element of the superimposed transmission via a coupler spur gear stage, the coupler spur gear stage comprising a drive gear and an output gear, and the coupler spur gear stage switched by means of a second coupling-switching element.

2. The hybrid drive according to claim 1, wherein the output gear of the coupler spur gear stage is arranged on a second hollow shaft which is located coaxially above the first hollow shaft, the second hollow shaft connected non-rotatably to the second input element of the superimposed transmission and to a coupling half of the bridging contact member.

3. The hybrid drive according to claim 2, wherein the drive gear of the coupler spur gear stage is designed in the form of a fixed gear, which is mounted non-rotatably on the input shaft of the coupler spur gear stage, and wherein the output gear of the coupler spur gear stage is designed in the form of an idler, which is swivel-mounted on the second hollow shaft and is connected to the second hollow shaft via the second coupling-switching element.

4. The hybrid drive according to claim 1, wherein the drive gear of the coupler spur gear stage is designed in the form of an idler, which is swivel-mounted on the input shaft of the gearbox and which is connected non-rotatably to the input shaft by means of the second coupling-switching element, and wherein the output gear of the coupler spur gear stage is designed in the form of a fixed gear, which is mounted non-rotatably on the second hollow shaft.

5. The hybrid drive according to claim 4, wherein the second coupling-switching element of the coupler spur gear stage is combined in a dual shift element with a gear shifting member of a directly axially adjacent spur gear stage of the gearbox, an idler of the directly axially adjacent spur gear stage being swivel-mounted on the input shaft of the gearbox.

6. The hybrid drive according to claim 1, wherein the electric machine is connected to the second input element of the superimposed transmission via first and second gear reduction stages connected in series.

7. The hybrid drive according to claim 6, wherein the electric machine is arranged axially parallel to the second output shaft of the gearbox and is radially adjacent to the superimposed transmission, and the rotor of the electric machine is connected to the second input element of the superimposed transmission via the first gear reduction stage on an input side which is designed in the form of a planetary gear step and the second gear reduction stage on an output side which is designed in the form of a spur gear stage.

8. The hybrid drive according to claim 6, wherein the electric machine is arranged coaxially to the second output shaft of the gearbox and axially adjacent to the superimposed transmission, and the rotor of the electric machine is drive connected to the second input element of the superimposed transmission via the first gear reduction stage on an input side which is designed in the form of a planetary gear step and the second gear reduction stage on an output side which is also designed in the form of a planetary gear step.

9. The hybrid drive according to claim 7, wherein the planetary gear step of the first gear reduction stage on the input side is designed in the form of a simple planetary transmission with a sun wheel, a planet carrier supporting multiple planetary gears and a ring gear, in which the sun wheel forms an input element of the first gear reduction stage on the input side, which is connected non-rotatably to the rotor of the electric machine, in which the ring gear forms an intermediate element of the first gear reduction stage on the input side, which is fixed at the housing, and in which the planet carrier forms an output element of the first gear reduction stage on the output side, which is connected non-rotatably to the drive gear or the input element of the first gear reduction stage on the input side.

10. The hybrid drive according to claim 1, wherein the superimposed transmission is a planetary transmission, and in electric drive mode the planetary transmission functions as a two-speed gearbox configured to have two gear steps switchable via the interlock switching device and the bridging contact member.

11. The hybrid drive according to claim 1, wherein the bridging contact member is a friction clutch, wherein the friction clutch is closed after disengaging the interlock switching device in a upshift mode, and in a downshift the friction clutch is opened up to a transition to a slip operation.

12. A hybrid drive of a motor vehicle, comprising:

a combustion engine with a drive shaft;

an electric machine with a rotor configured to operate as a motor or a generator;

an automated gearbox comprising an input shaft, and first and second output shafts, the input shaft connected to the first output shaft via multiple selectively switchable spur gear stages comprising first, second and third switchable spur gear stages and a coupler spur gear stage, the input shaft connected to the second output shaft via a fourth selectively switchable spur gear stage, wherein the first and fourth selectively switchable spur gear stages utilize a mutual fixed gear mounted non-rotatably on the input shaft; and a superimposed transmission comprising a first and second input elements, and an output element, the first input element connected non-rotatably to a first hollow shaft arranged coaxially with the second output shaft, wherein the input shaft is connected via a controllable decoupler or directly to the drive shaft, and the superimposed transmission is arranged coaxially with a free end of the second output shaft, wherein the first hollow shaft is connected non-rotatably to an idler of the fourth selectively switchable spur gear stage which is axially adjacent to the first hollow shaft via a first coupling-switching element, and the first hollow shaft is fixed at a housing via an interlock switching device, and via a bridging contact member the first hollow shaft is connected non-rotatably to the second input element or the output element, wherein the second input element of the superimposed transmission is permanently connected to the rotor of the electric machine, and the output element of the superimposed transmission is connected non-rotatably to the second output shaft, and wherein the input shaft of the gearbox is connected to the second input element of the superimposed transmission via the coupler spur gear stage, the coupler spur gear stage comprising a drive gear and an output gear, and the coupler spur gear stage switched by means of a second coupling-switching element.

13. The hybrid drive according to claim 12, wherein the first, second and third selectively switchable spur gear stages each comprise an idler, the idlers of the first and fourth switchable gear stages mate with the mutual fixed gear while the idlers of the second and third switchable spur gear stages mate with corresponding drive gears, respectively.

14. The hybrid drive according to claim 13, wherein the idlers of the first and second switchable spur gear stages are connected non-rotatably to the first output shaft by corresponding gear shifting members.

15. The hybrid drive according to claim 13, wherein the idlers of the first and second selectively switchable spur gears are swivel-mounted on the first output shaft while the idler of the third switchable spur gear stages is swivel-mounted on the drive shaft.

16. The hybrid drive according to claim 12, wherein the idlers of the first, second and third selectively switchable spur gears are swivel-mounted on the first output shaft, and the drive gears of the second and third selectively switchable spur gear stages are fixed on the drive shaft.

17. A hybrid drive of a motor vehicle, comprising:

a combustion engine with a drive shaft;

an electric machine with a rotor configured to operate as a motor or a generator;

an automated gearbox comprising an input shaft, and first and second output shafts, the input shaft connected to the first output shaft via multiple selectively switchable spur gear stages comprising first, second and third switchable spur gear stages and a coupler spur gear stage, the input shaft connected to the second output shaft via a fourth selectively switchable spur gear stage; and a superimposed transmission comprising a first and second input elements, and an output element, the first input element connected non-rotatably to a first hollow shaft arranged coaxially with the second output shaft, wherein the input shaft is connected via a controllable decoupler or directly to the drive shaft and, and the superimposed transmission is arranged coaxially with a free end of the second output shaft, wherein the first hollow shaft is connected non-rotatably to an idler of the fourth selectively switchable spur gear stage which is axially adjacent to the first hollow shaft via a first coupling-switching element, and the first hollow shaft is fixed at a housing via an interlock switching device, and via a bridging contact member the first hollow shaft is connected non-rotatably to the second input element or the output element, wherein the second input element of the superimposed transmission is connected to the rotor of the electric machine via multiple gear reduction stages comprising at least one planetary transmission, and the output element of the superimposed transmission is connected non-rotatably to the second output shaft, and wherein the input shaft of the gearbox is connected to the second input element of the superimposed transmission via the coupler spur gear stage, the coupler spur gear stage comprising a drive gear and an output gear, and the coupler spur gear stage switched by means of a second coupling-switching element.

18. The hybrid drive according to claim 17, wherein the multiple gear reduction stages further comprise a spur gear stage with a drive gear which is connected non-rotatably to an output element of said at least one planetary transmission.

19. The hybrid drive according to claim 17, wherein the multiple gear reduction stages comprise at least two planetary transmissions, each of which comprises a sun wheel, a planet carrier supporting multiple planetary gears, and a ring gear, wherein one of the two planetary transmission is arranged radially within the other planetary transmission.

20. A method for controlling a hybrid drive according to claim 1, wherein the combustion engine is started in electric drive with the following steps:

opening the decoupler configured to be passively closed;

engaging a gear shifting member of the directly adjacent axial spur gear stage of a highest gear of the gearbox;

closing the decoupler and simultaneously increasing a torque released from the electric machine, until the combustion engine is started; and opening the decoupler.

* * * * *